(12) United States Patent
Lum

(10) Patent No.: US 12,143,422 B2
(45) Date of Patent: Nov. 12, 2024

(54) DISTRIBUTED SECURITY FABRIC GENERATION OVER MULTIPLE LEVELS OF NETWORK GATEWAYS

(71) Applicant: Fortinet, Inc., Sunnyvale, CA (US)

(72) Inventor: Justin William Lum, Vancouver (CA)

(73) Assignee: Fortinet, Inc., Sunnyvale, CA (US)

( * ) Notice: Subject to any disclaimer, the term of this patent is extended or adjusted under 35 U.S.C. 154(b) by 229 days.

(21) Appl. No.: 17/958,272

(22) Filed: Sep. 30, 2022

(65) Prior Publication Data
US 2024/0114055 A1 Apr. 4, 2024

(51) Int. Cl.
*H04L 9/40* (2022.01)
*H04L 67/02* (2022.01)

(52) U.S. Cl.
CPC ............ *H04L 63/20* (2013.01); *H04L 63/105* (2013.01); *H04L 67/02* (2013.01)

(58) Field of Classification Search
CPC ........ H04L 63/20; H04L 63/105; H04L 67/02
See application file for complete search history.

(56) References Cited

U.S. PATENT DOCUMENTS

| | | | |
|---|---|---|---|
| 11,893,410 B2* | 2/2024 | Srivastava | G06F 9/45558 |
| 2006/0041794 A1* | 2/2006 | Aaron | G06F 11/3006 |
| | | | 714/47.2 |
| 2017/0201850 A1* | 7/2017 | Raleigh | H04W 4/50 |
| 2017/0223046 A1* | 8/2017 | Singh | H04L 63/1491 |
| 2018/0189499 A1* | 7/2018 | Perera | H04L 69/00 |
| 2021/0329022 A1* | 10/2021 | Chhetri | H04L 67/34 |

* cited by examiner

*Primary Examiner* — El Hadji M Sall
(74) *Attorney, Agent, or Firm* — Law Office of Dorian Cartwright; Dorian Cartwright

(57) ABSTRACT

Responsive to the request for a security fabric report, an upper-level node transits a request to a lower-level node for a subtree security report. If there are additional network gateways at lower hierarchical levels, the next level down repeats the process. A root level network gateway will transmit the first request, as the high level of the hierarchy, and a last leaf receives the last request, as the lowest level. An overall security fabric report is returned from the root node.

5 Claims, 6 Drawing Sheets

DISTRIBUTED SECURITY FABRIC GENERATION OVER MULTIPLE LEVELS OF NETWORK GATEWAYS

FIELD OF THE INVENTION

The invention relates generally to computer security, and more specifically, for distributing security report generation over multiple levels of network gateways in a security fabric.

BACKGROUND

Performance issues occur with security fabrics as a number of network gateways in the topology increases, preventing scalability. For example, when a security fabric report is needed, that contains information on all devices to determine a security score and a network topology, the HTTP server can become overburdened.

In FIG. 1, a root network gateway 110A has a downstream network gateway 110B, which in turn, has downstream network gateways 110C and 110D, which are peers. A request for a security fabric report is commandeered centrally from the root network gateway 110A. As a result, each request to each managed device downstream is sent from the same HTTP server of the root network gateway 110A. This process causes CPU and memory usage of network gateway 110A to spike and go into conserve mode on larger topologies—around 30-35 network gateways from testing. As the requests are completed, the root network gateway 110A is then in charge or taking these responses to then construct the appropriate report and do various pieces of manipulation on the data. Additionally, each request is cached on the root network gateway because some reports end up needing to query the same data multiple times. This design puts an excessive workload on the root network gateway 110A as it is responsible for almost the entire process, other than generating the HTTP response.

The proxied HTTP requests incur the overhead for relaying HTTP requests over the security fabric protocol to send to downstream devices. There are currently around 150 HTTP requests that are sent to each network gateway in the security fabric topology to generate the Security Rating report so as more devices join the topology this puts an extreme amount of stress on the Security Fabric protocol when it must relay n*150 requests, where n is the number of downstream devices in the topology.

Multiple levels in the topology can put an extra load on intermediate nodes in the tree as they will receive the HTTP requests for their downstream devices to figure out the next hop.

Therefore, what is needed is a robust technique for distributing security report generation over multiple levels of a security fabric.

SUMMARY

These shortcomings are addressed by the present disclosure of methods, computer program products, and systems for distributing security report generation over multiple levels of a security fabric.

In one embodiment, responsive to the request for a security fabric report, an upper-level node transits a request to a lower-level node for a subtree security report. If there are additional network gateways at lower hierarchical levels, the next level down repeats the process. A root level network gateway will transmit the first request, as the high level of the hierarchy, and a last leaf receives the last request, as the lowest level.

In another embodiment, a current level node sends a series of HTTP requests from an HTTP server to managed devices of a local subtree and receives HTTP responses. Data from the responses is utilized by the current level node, to generate a subtree security fabric report. To do so, local subtree data is combined with the same received from lower nodes. A lower-level node transmits the resulting subtree fabric report upstream to a higher level for processing, until reaching a root node at the top level of the hierarchy.

In still another embodiment, an overall security fabric report is returned from the root node.

Advantageously, computer network performance is improved without bogged down HTTP servers and overburdened network gateways.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The description below provides methods, computer program products, and systems for distributing security report generation over multiple levels of a security fabric. One of ordinary skill in the art will recognize many additional variations made possible by the succinct description of techniques below.

I. Systems for Distributing Security Report Generation (FIGS. 2-3)

Figure 1:
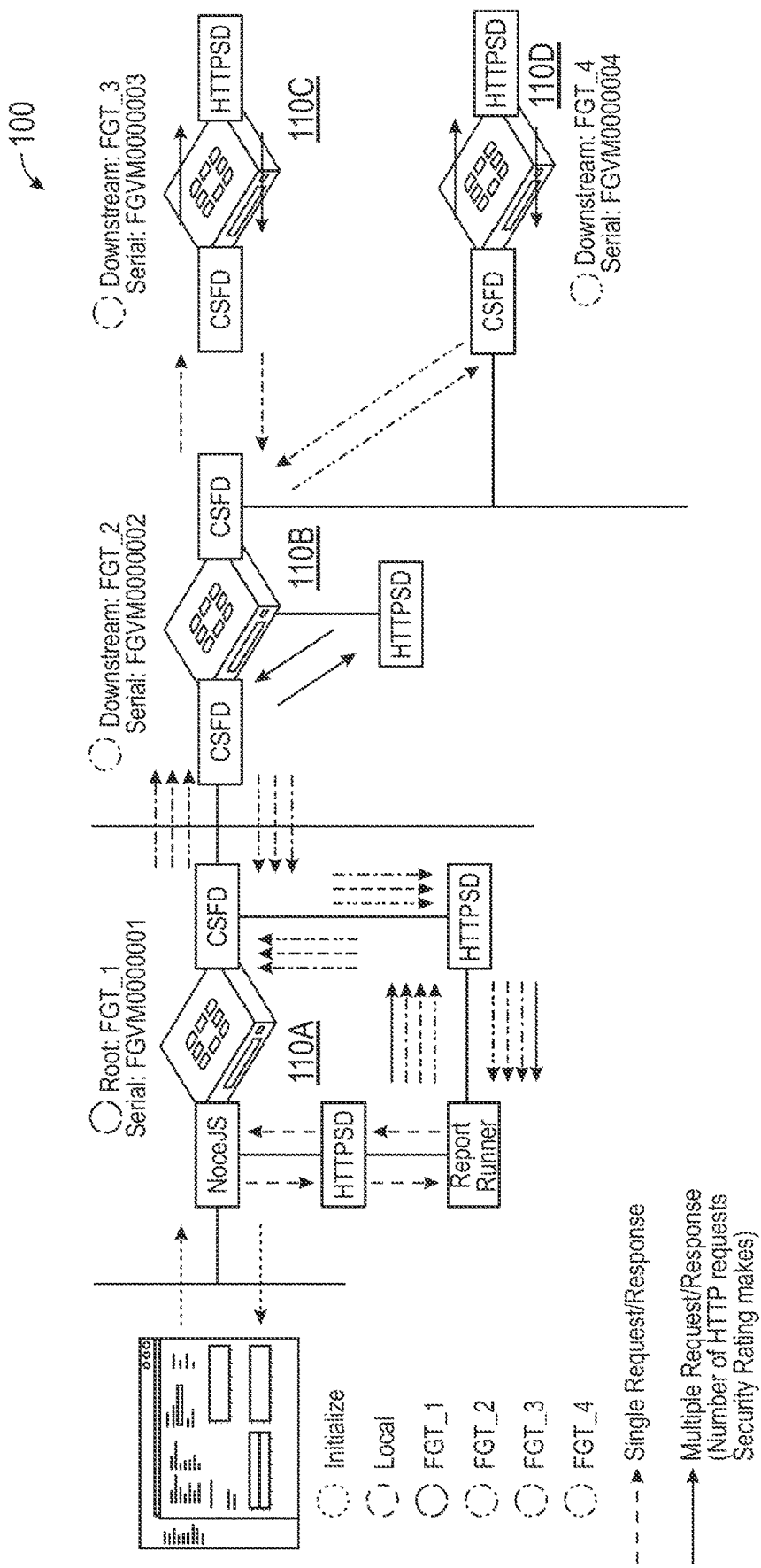
FIG. 1 is a block diagram illustrating a prior art system for single-point security point generation, according to an embodiment.
Figure 2:
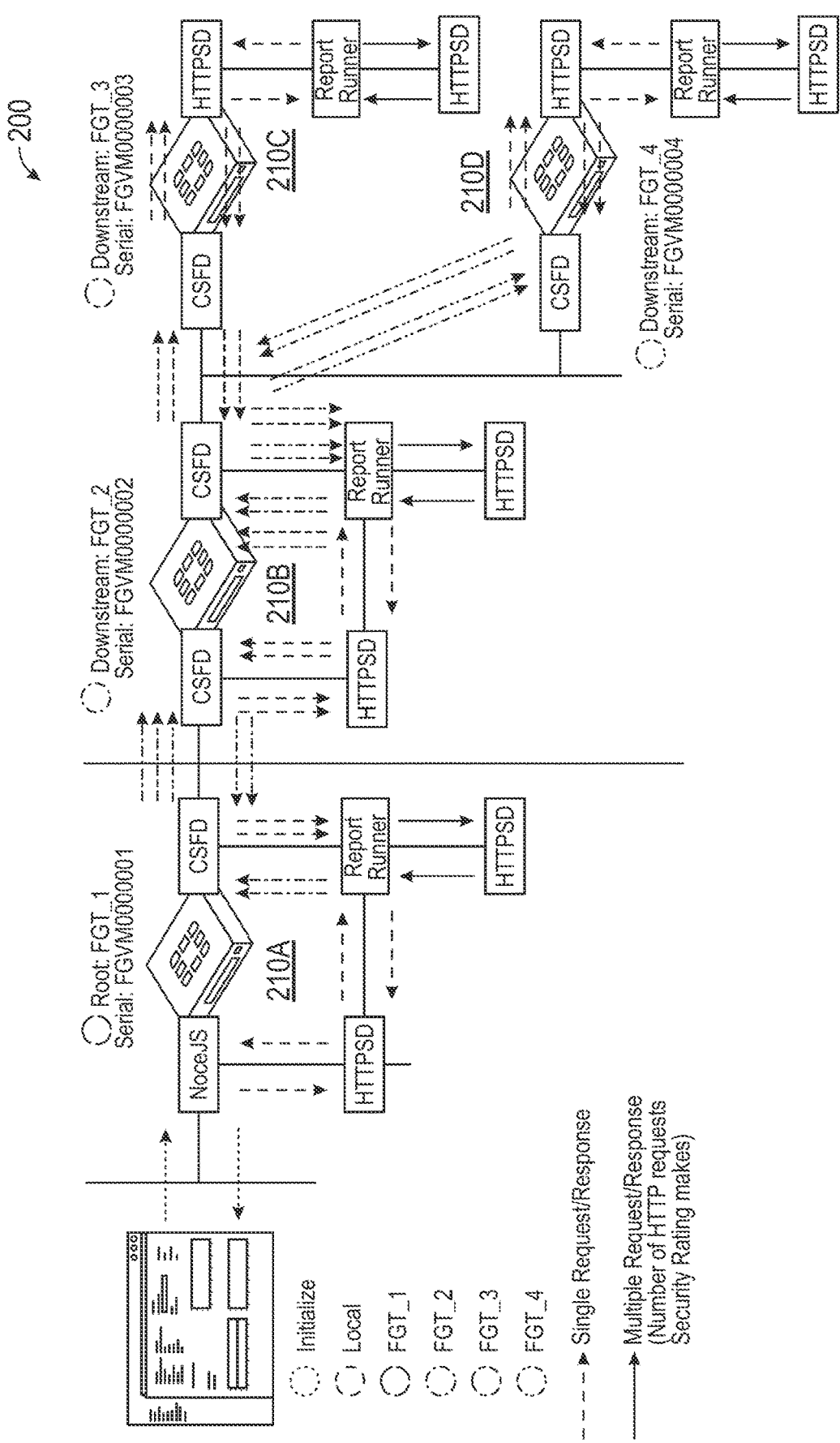
FIG. 2 is a block diagram illustrating a system for distributing security report generation over multiple levels of a security fabric, according to an embodiment.
Figure 3:
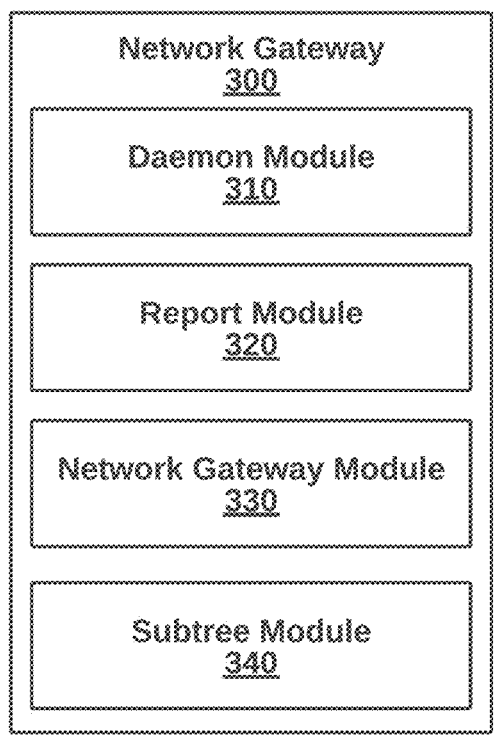
FIG. 3 is a more detailed block diagram illustrating a network gateway device of the system of FIG. 1, according to an embodiment.

FIG. 2 is a block diagram illustrating a system 200 for distributing security report generation over multiple levels of a security fabric, according to an embodiment. The system 200 includes network gateways 210A,B,C,D, coupled to a data communication network. Many other configurations are possible, for example, with additional network components such routers, switches, repeaters, firewalls, and the like. Also, there can be many more or fewer network gateways in FIG. 1. The system components can be implemented in computer devices with non-transitory source code, such as set forth below with reference to FIG. 6.

The components of the system 200 are coupled in communication over the data communication network. The components can be connected to the data communication system via hard wire. The data communication network 199 can be any data communication network such as an SDWAN, an SDN (Software Defined Network), WAN, a LAN, WLAN, a cellular network (e.g., 3G, 4G, 5G or 6G), or a hybrid of different types of networks. Various data protocols can dictate format for the data packets. For example, Wi-Fi data packets can be formatted according to IEEE 802.11, IEEE 802.11r, and the like.

The network gateways 110A,B,C,D sit at different hierarchical levels, starting with network gateway 110A at a top, root level node, network gateway 110B at a second lower level node, and finally, network gateways 110C and 110D as peers at a third lower level node.

Compared to the prior art of FIG. 1, a single communication is sent to downstream network gateway levels to request security fabric reports of lower levels, and a single communication is returned to upstream network gateway levels to receive security fabric reports. Each network gateway handles its own subtree of managed devices. The managed devices can be Wi-Fi controllers, access points, switches, stations, and the like. In more detail, one or more HTTP requests are sent to each device interrogating various conditions about hardware, software, connected devices, network conditions and statistics, and the like. Responsive HTTP responses are used to analyze vulnerabilities, network topology and the like, depending on requirements of the security fabric report.

FIG. 2 is a more detailed block diagram illustrating a network gateway device of the system of FIG. 1, according to an embodiment. The network gateway device 110 includes a daemon module 210, a report module 220, a network gateway module 230 and a subtree module 240. The modules can be implemented in source code stored in non-transitory memory executed by a processor. Alternatively, the modules can be implemented in hardware with microcode. The modules can be singular or representative of functionality spread over multiple components. Many other variations are possible.

The daemon module 210 transmits a request to a root network gateway for generation of a security fabric report for the network gateway system, the security fabric report including topology and security rating for the multiple levels of the security fabric.

The subtree module 240 transmits a series of HTTP requests for data from a root subtree responsive to the request for the security fabric report.

The network gateway module 230 transmits a report generation request to a child network gateway of the security fabric that is downstream from the root network gateway, a request through the daemon for a subtree report, The report module 220 compiles the security fabric report comprising the data received from the local subtree and the downstream subtree report.

III. Methods for Distributing Security Report Generation (FIGS. 4-5)

Figure 4:
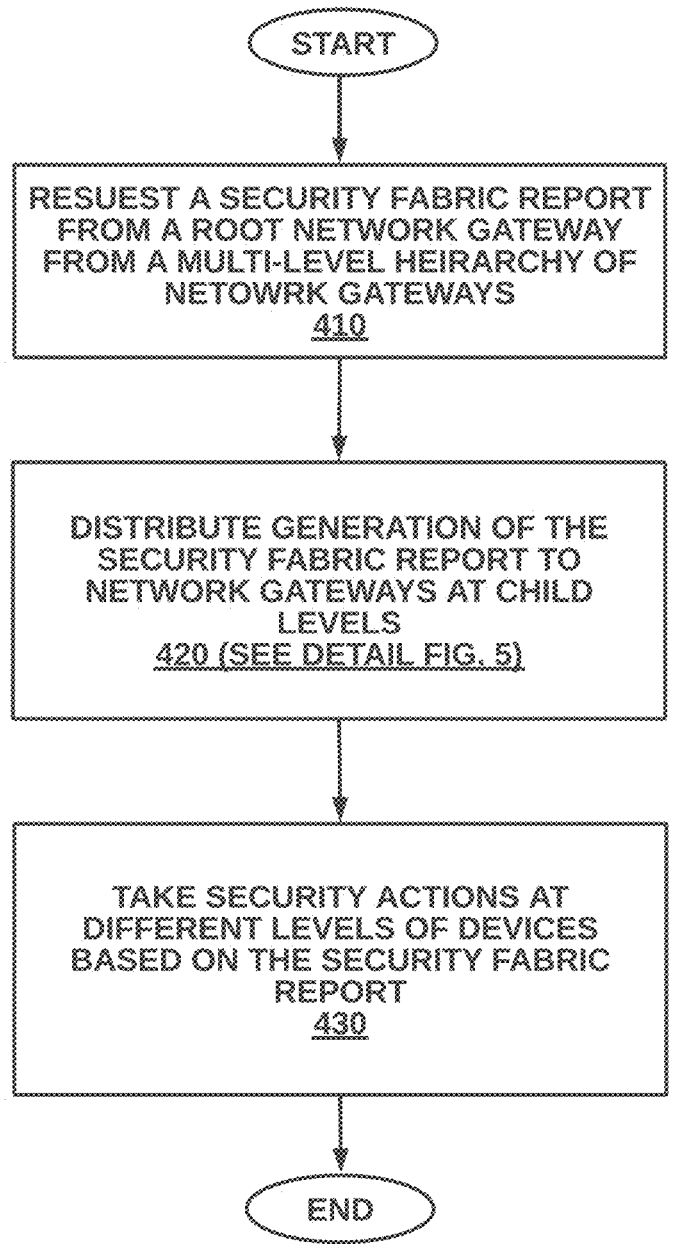
FIG. 4 is a high-level flow diagram illustrating a method of generating a security fabric report to determine necessary security actions for an enterprise network, according to an embodiment.

FIG. 4 is a high-level flow diagram illustrating a method 400 for distributing security report generation over multiple levels of a security fabric, according to one preferred embodiment. The method 400 can be implemented, for example, by the system 100. The steps are merely representative groupings of functionality, as there can be more or fewer steps, and the steps can be performed in different orders. Many other variations of the method 400 are possible.

At step 410, a network administrator or automated process requests a security fabric report. The request can be periodic, based on a new network configuration, a recent malicious attack, or for other reasons. The security fabric report can include network topology and security rating for the multiple levels of the security fabric. At step 420, security report generation is distributed over several hierarchical levels of network gateways, as described below in FIG. 5. At step 330, responsive to results of the security fabric report, manual or automatic security actions are taken.

Figure 5:
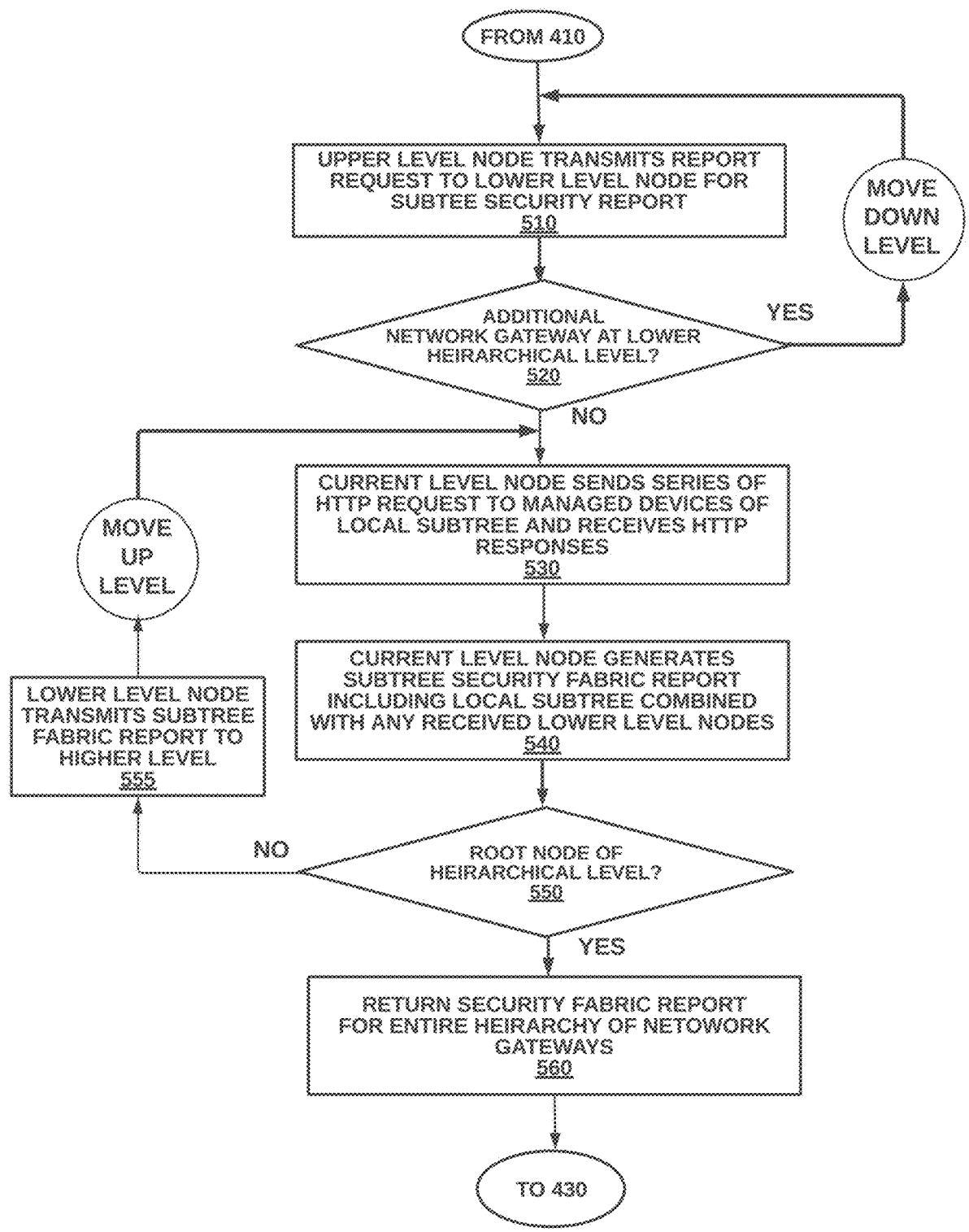
FIG. 5 is a more detailed flow diagram illustrating a step for distributing security fabric report generation over multiple levels of a security fabric, from the method of FIG. 4, according to one preferred embodiment.

Turning to FIG. 5, at step 510, a series of HTTP requests is transmitted from an HTTP server of a root network gateway for data from a root subtree responsive to the request for the security fabric report.

At step 510, responsive to the request for a security fabric report at step 420 in FIG. 4, an upper-level node transits a request to a lower level node for a subtree security report. If there are additional network gateways at lower hierarchical levels, at step 520, the next level down repeats the process. A root level network gateway will transmit the first request, as the high level of the hierarchy, and a last leaf receives the last request, as the lowest level.

At step 530, a current level node sends a series of HTTP requests from an HTTP server to managed devices of a local subtree and receives HTTP responses. Data from the responses is utilized by the current level node, at step 540, to generate a subtree security fabric report. To do so, local subtree data is combined with the same received from lower nodes. At step 555, a lower-level node transmits the resulting subtree fabric report upstream to a higher level for processing, until reaching a root node at the top level of the hierarchy, at step 550.

Once complete, a security fabric report is returned to the daemon for the entire hierarchy of network gateways, for processing in step 430, described above.

V. Computing Environment for Distributed Report Generation (FIG. 6)

Figure 6:
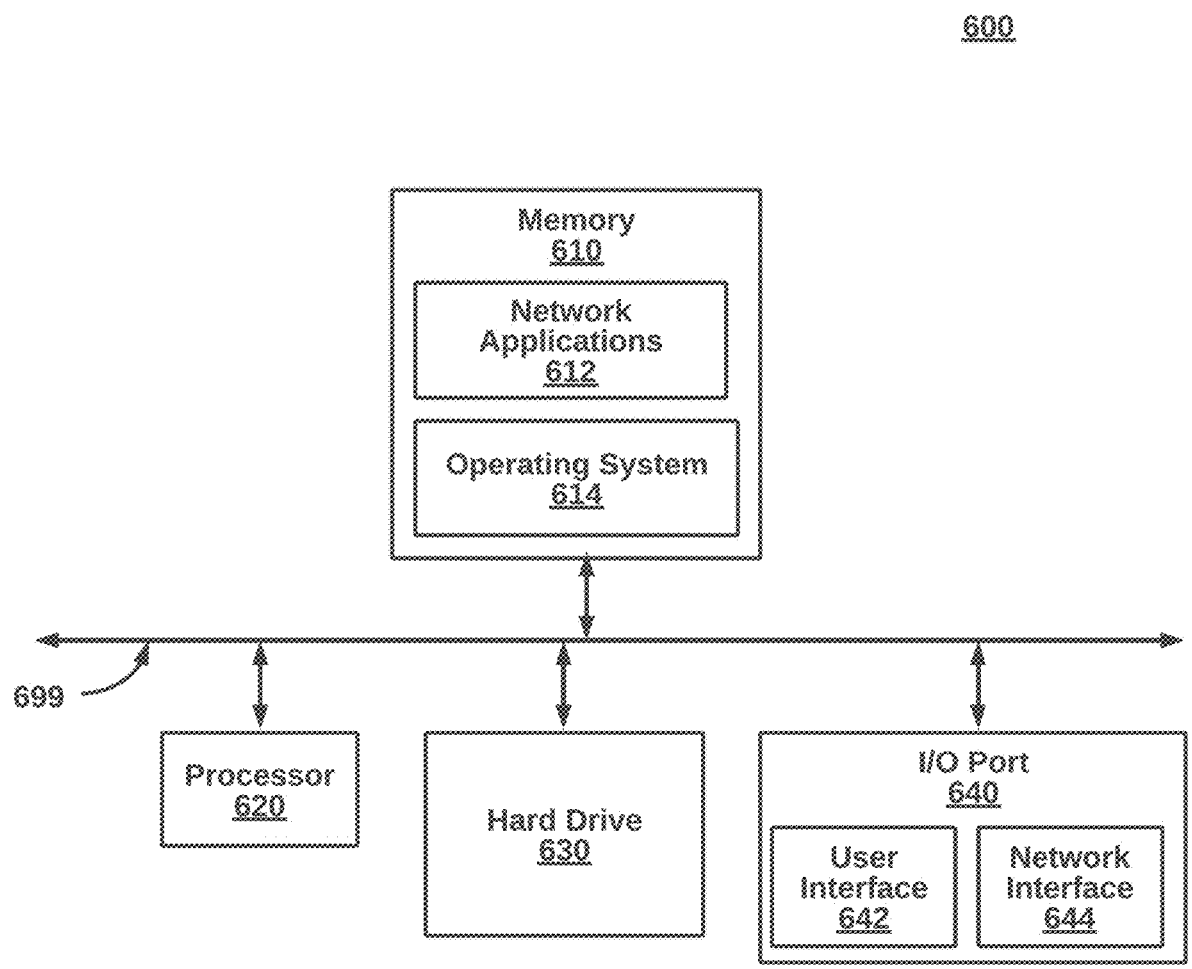
FIG. 6 is a high-level block diagram illustrating a computing device as an example hardware implementation of network devices herein, according to an embodiment.

FIG. 6 is a block diagram illustrating a computing device 600 capable of implementing components of the system, according to an embodiment. The computing device 600 of the present embodiment, includes a memory 610, a processor 620, a storage drive 630, and an I/O port 640. Each of the components is coupled for electronic communication via a bus 699. Communication can be digital and/or analog and use any suitable protocol. The computing device 600 can be any of components of the system 100, other networking devices (e.g., an access point, a firewall device, a gateway, a router, or a wireless station), or a disconnected device.

Network applications 612 (e.g., VM nodes 120A-F) can be network browsers, daemons communicating with other network devices, network protocol software, and the like. An operating system 614 within the computing device 600 executes software, processes. Standard components of the real OS environment 614 include an API module, a process list, a hardware information module, a firmware information module, and a file system. The operating system 614 can be FORTIOS, one of the Microsoft Windows® family of operating systems (e.g., Windows 96, 98, Me, Windows NT, Windows 2000, Windows XP, Windows XP x64 Edition, Windows Vista, Windows CE, Windows Mobile, Windows 6 or Windows 8), Linux, HP-UX, UNIX, Sun OS, Solaris, Mac OS X, Alpha OS, AIX, IRIX32, IRIX64, or Android. Other operating systems may be used. Microsoft Windows is a trademark of Microsoft Corporation.

The storage drive 630 can be any non-volatile type of storage such as a magnetic disc, EEPROM (electronically erasable programmable read-only memory), Flash, or the like. The storage drive 630 stores code and data for applications.

The I/O port 640 further comprises a user interface 642 and a network interface 644. The user interface 642 can output to a display device and receive input from, for example, a keyboard. The network interface 644 (e.g., an RF antennae) connects to a medium such as Ethernet or Wi-Fi for data input and output. Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems). Some embodiments can be implemented with artificial intelligence.

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

I claim:

1. A method in a network gateway system for distributing security report generation over multiple levels of a security fabric, the method comprising:
   transmitting a request to a root network gateway, by a daemon of the security fabric, for generation of a security fabric report for the network gateway system, the security fabric report including topology and security rating for the multiple levels of the security fabric;
   transmitting, from an HTTP server of a root network gateway, a series of HTTP requests for data from a root subtree responsive to the request for the security fabric report;
   transmitting, from the HTTP server of the root network gateway to a child network gateway of the security fabric that is downstream from the root network gateway, a request through the daemon for a subtree report, wherein the child network gateway transmits a series of HTTP requests data to a child subtree,
   wherein responsive to the child network gateway being not being a leaf node, the child network gateway transmits a further request through the daemon to a grandchild network gateway of the security fabric that is further downstream from the child network gateway, wherein the grandchild network gateway transmits a series of HTTP requests to local grandchild devices;
   receiving and analyzing data from the subtree responsive to the series of HTTP requests;
   receiving the downstream subtree report from the child network gateway based on responses received and analyzed from the downstream subtree responsive to the series of HTTP requests from the child network gateway, and a grandchild subtree report received by the child network gateway from the grandchild network gateway; and compiling the security fabric report comprising the data received from the local subtree and the downstream subtree report.

2. The network gateway system of claim 1, wherein a leaf node comprises more than one network gateway.

3. The network gateway system of claim 1, wherein the root network gateway opens a socket to the daemon to transmit the subtree network gateway report.

4. A network gateway system for distributing security report generation over multiple levels of a security fabric, the network gateway device comprising:
- a daemon to transmit a request to a root network gateway for generation of a security fabric report for the network gateway system, the security fabric report including topology and security rating for the multiple levels of the security fabric;
- an HTTP server of a root network gateway to transmit a series of HTTP requests for data from a root subtree responsive to the request for the security fabric report;
- an HTTP server of the root network gateway to transmit to a child network gateway of the security fabric that is downstream from the root network gateway, a request through the daemon for a subtree report,
- wherein the child network gateway transmits a series of HTTP requests data to a child subtree,
  - wherein responsive to the child network gateway being not being a leaf node, the child network gateway transmits a further request through the daemon to a grandchild network gateway of the security fabric that is further downstream from the child network gateway, wherein the grandchild network gateway transmits a series of HTTP requests to local grandchild devices,
  - the child network gateway to receive and analyze data from the subtree responsive to the series of HTTP requests;
  - the root network gateway to receive the downstream subtree report from the child network gateway based on responses received and analyzed from the downstream subtree responsive to the series of HTTP requests from the child network gateway, and a grandchild subtree report received by the child network gateway from the grandchild network gateway,
  - wherein the root network gateway compiles the security fabric report comprising the data received from the local subtree and the downstream subtree report.

5. A non-transitory computer-readable media in a network gateway device, for distributing security report generation over multiple levels of a security fabric, the method comprising the steps of:
- transmitting a request to a root network gateway, by a daemon of the security fabric, for generation of a security fabric report for the network gateway system, the security fabric report including topology and security rating for the multiple levels of the security fabric;
- transmitting, from an HTTP server of a root network gateway, a series of HTTP requests for data from a root subtree responsive to the request for the security fabric report;
- transmitting, from the HTTP server of the root network gateway to a child network gateway of the security fabric that is downstream from the root network gateway, a request through the daemon for a subtree report,
- wherein the child network gateway transmits a series of HTTP requests data to a child subtree,
- wherein responsive to the child network gateway being not being a leaf node, the child network gateway transmits a further request through the daemon to a grandchild network gateway of the security fabric that is further downstream from the child network gateway, wherein the grandchild network gateway transmits a series of HTTP requests to local grandchild devices;
- receiving and analyzing data from the subtree responsive to the series of HTTP requests;
- receiving the downstream subtree report from the child network gateway based on responses received and analyzed from the downstream subtree responsive to the series of HTTP requests from the child network gateway, and a grandchild subtree report received by the child network gateway from the grandchild network gateway; and
- compiling the security fabric report comprising the data received from the local subtree and the downstream subtree report.

\* \* \* \* \*